Figure 1:
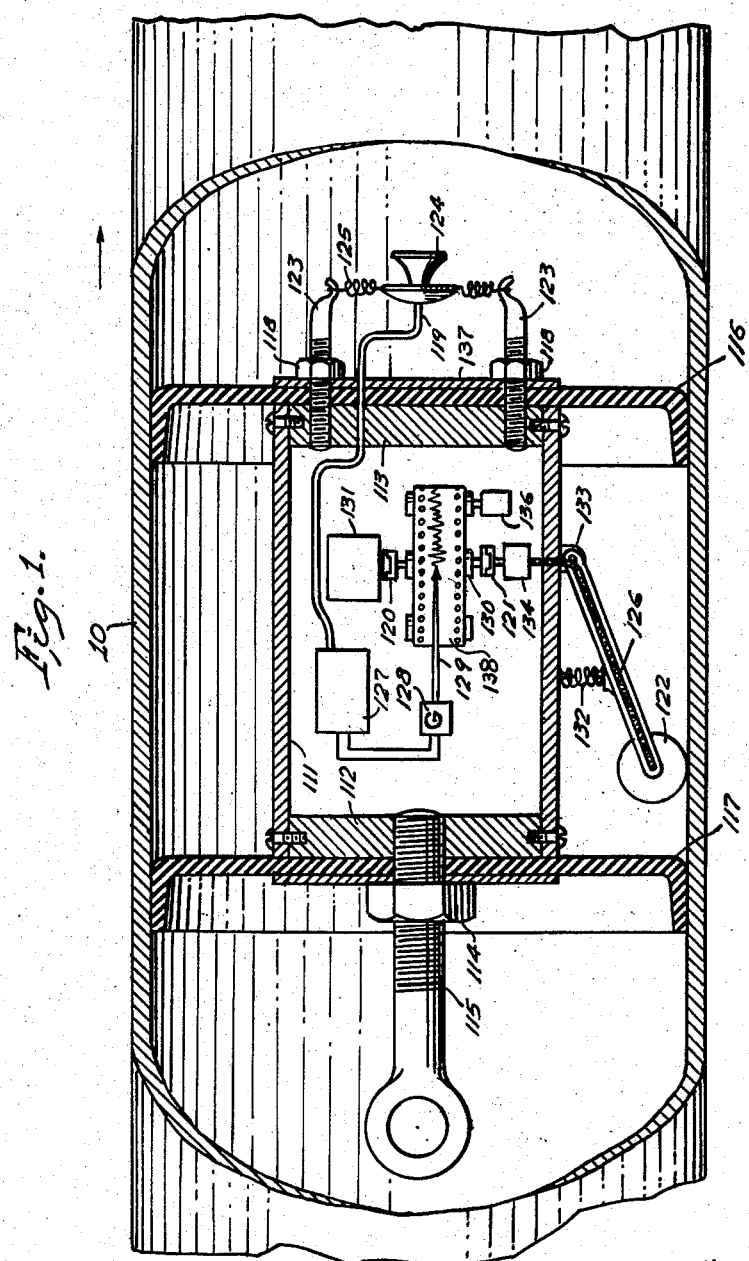

April 28, 1959 H. J. EN DEAN ET AL 2,884,624
PIPELINE SURVEYING
Filed June 28, 1956 4 Sheets-Sheet 1

INVENTORS.
Howard J. EnDean,
John Delbert Jones and
Edward Topanelian Jr.
BY
ATTORNEYS

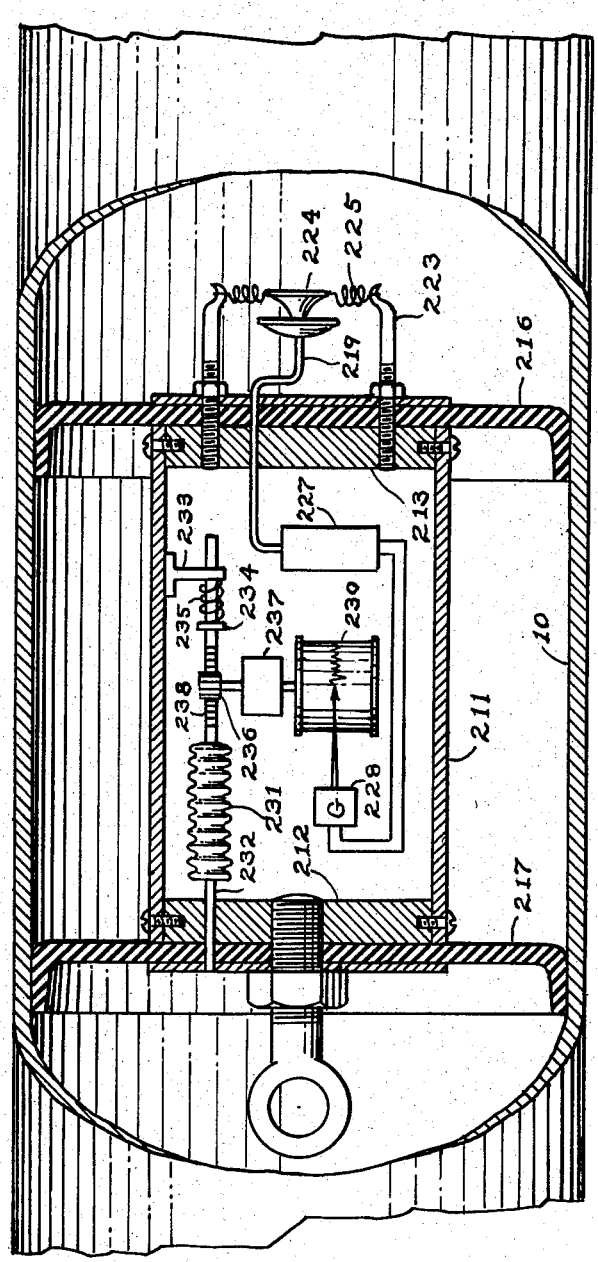

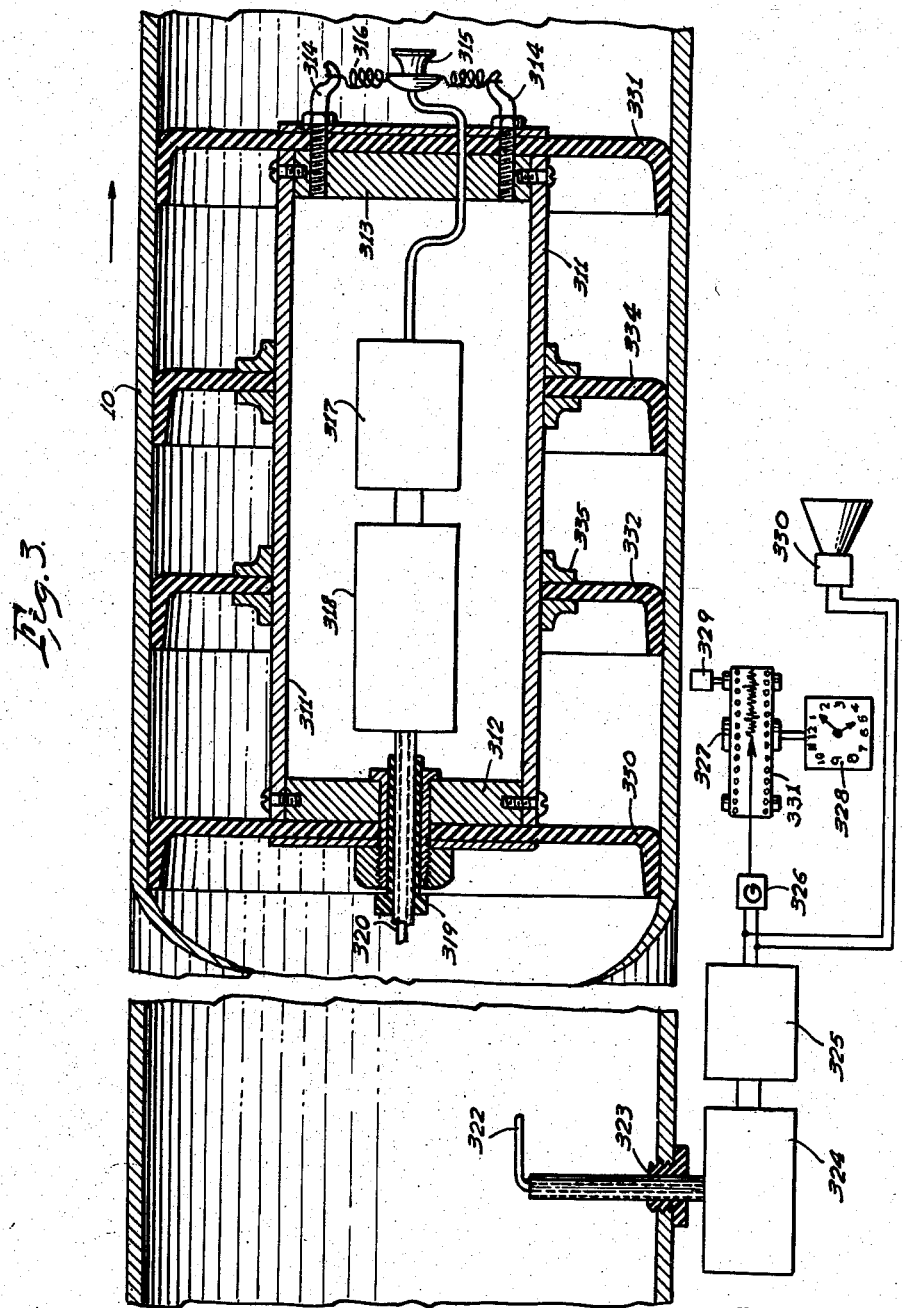

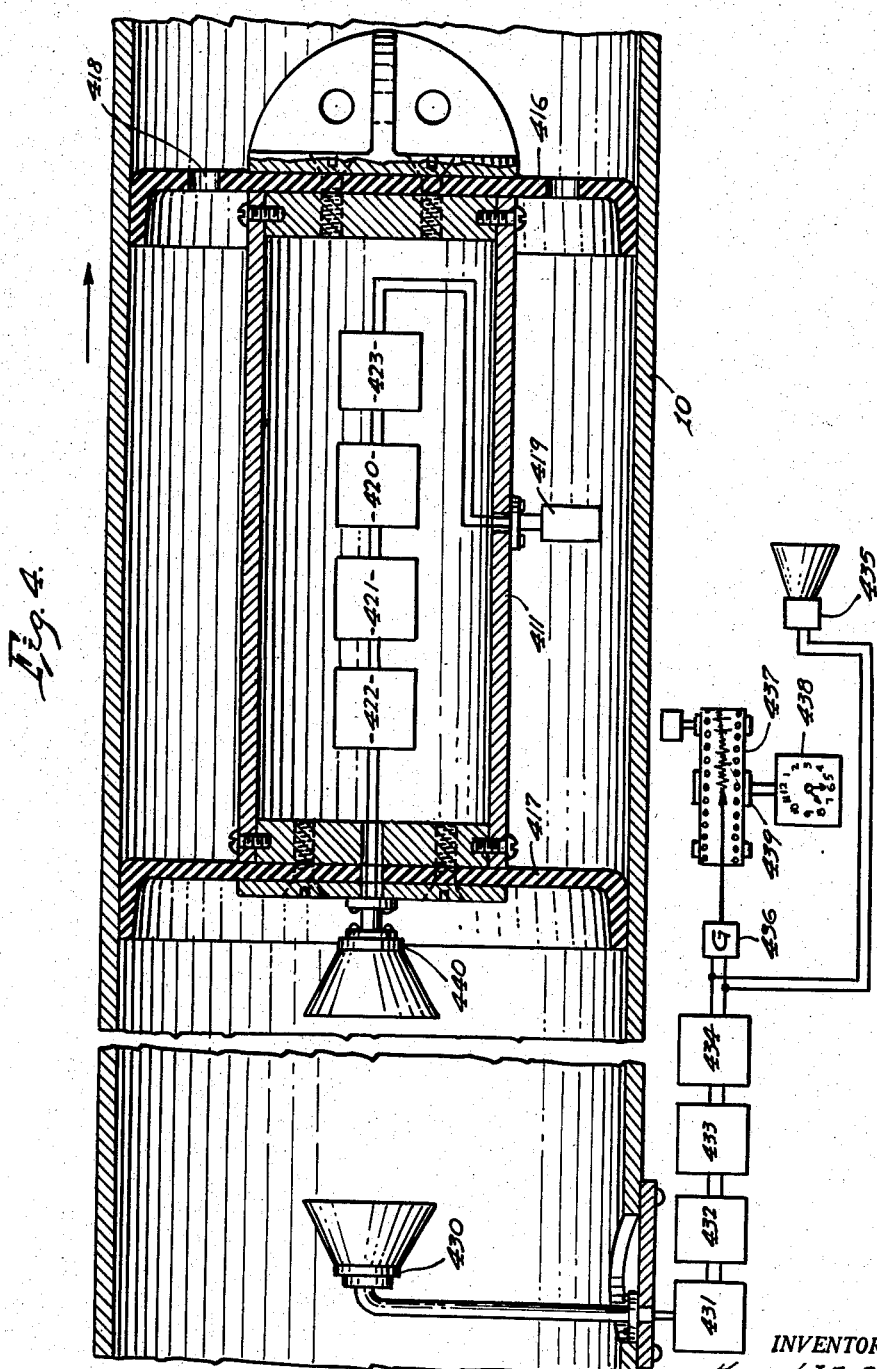

United States Patent Office 2,884,624
Patented Apr. 28, 1959

2,884,624

PIPELINE SURVEYING

Howard J. En Dean, Fox Chapel, Pa., John Delbert Jones, Tulsa, Okla., and Edward Topanelian, Jr., Pittsburgh, Pa., assignors to Gulf Research & Development Company, Pittsburgh, Pa., a corporation of Delaware Application June 28, 1956, Serial No. 594,641

5 Claims. (Cl. 340—282)

This invention concerns a method and apparatus for making surveys in pipelines, and in particular concerns a method and apparatus for locating leaks in a transportation pipeline to which access may be had to the inside only.

It is well known that pipelines occasionally develop leaks which are oftentimes difficult to locate, particularly if the leak is small. Where pipelines are laid in tile even moderately-sized leaks may persist for long periods without detection and the location of surface evidence of the leak may not correspond with the location of the actual pipeline leak. Under certain conditions a leak of sufficient magnitude may be found by inspection of the surface of the ground as is customarily done by a pipe walker or by aerial surveys.

Generally the heretofore known methods of locating leaks are expensive and have the disadvantage of being incapable of detecting small leaks until the amount of fluid which has leaked out of the pipeline becomes large enough to be recognizable by visual observation. Prior to visual recognition such small leaks may nevertheless cause expensive damages to crops, water supplies, etc., in addition to the loss of accumulated amounts of the transported material. In the case of pipelines which carry volatile inflammable products such as gasoline, the fire and explosion hazards which result from a small leak are obvious and illustrate the necessity of promptly locating even small leaks in pipelines of this character.

It is known that the fluid leaking from a pipeline under pressure will produce sound waves in the pipeline fluid which manifest themselves as noise. In the method of this invention a device is inserted in the pipeline which carries a microphone sensitive to these sound waves and adapted to record their intensity on a record medium. In another embodiment of the invention the noise detected by the microphone is transmitted to the pumping station and is recorded there.

The method of this invention is applicable to pipelines used for transportation purposes through which fluid materials are pumped. In the method of this invention a microphone is placed in the pipeline and caused to traverse the inside of the pipe by the transported fluid entirely free of any rigid physical connection to the ends of the pipeline. By means of this invention the entire pipeline may be tested as frequently as desired without necessitating the use of personnel to observe all portions of the pipeline or its right of way, and without introducing wires, lines or other extraneous means into the pipeline, and without interfering with the normal operation of the pipeline.

It is accordingly an object of this invention to provide a method and apparatus for locating leaks in a transportation pipeline wherein a free sound-detecting device is caused to traverse the inside of the pipeline by motion of the transported fluid.

It is a further object of this invention to provide a method of locating leaks in a pipeline by pumping a free noise-detecting device from one end of the pipeline to the other.

It is a further object of this invention to provide a method of locating leaks in a pipeline by pumping a free noise-detecting device from one end of the pipeline to the other and transmitting to the dispatching station through the fluid-filled pipeline electromagnetic signals representative of the detected noise.

It is a further object of this invention to provide a method of locating leaks in a pipeline by pumping a free noise-detecting device from one end of the pipeline to the other and transmitting to the dispatching station through the fluid-filled pipeline supersonic vibrations representative of the detected noise.

It is a further object of this invention to provide an apparatus which is carried from one end of a pipeline to the other by the pumped fluid and which is capable of detecting and locating small leaks in a pipeline whose outer surface is obscured.

It is a further object of this invention to provide an apparatus which is capable of detecting small leaks in a pipeline by recording the noise in the pipeline fluid together with another parameter indicative of position along the traverse.

It is a further object of this invention to provide an apparatus which may be pumped from one end of a pipeline to the other and which concurrently transmits by electromagnetic waves through the fluid-filled pipeline a signal which is indicative of the noise encountered in traversing the pipeline.

It is a further object of this invention to provide an apparatus which may be pumped from one end of a pipeline to the other and which concurrently transmits by supersonic vibrations through the fluid-filled pipeline a signal which is indicative of the noise encountered in traversing the pipeline.

These and other useful objects are accomplished by this invention in the manner described in this specification, of which the drawings form a part, and in which Figure 1 shows a diagrammatical view of an apparatus of this invention for surveying the noise inside a pipeline and simultaneously recording the noise intensity either as a function of time or as a function of distance traversed;

Figure 2 shows a diagrammatical view of an apparatus of this invention for surveying the noise inside a pipeline and simultaneously recording the noise intensity as a function of the pressure drop in the pipeline;

Figure 3 shows a diagrammatical view of an apparatus of this invention for surveying the noise inside a pipeline and transmitting to the dispatching station electromagnetic signals indicative of the detected noise; and Figure 4 shows a diagrammatical view of an apparatus of this invention for surveying the noise inside a pipeline and transmitting indications of the detected noise to the dispatching station by means of supersonic vibrations in the pipeline fluid.

The apparatus of this invention comprises a carrier which may be freely pumped from one end of the pipeline to the other and which embodies a microphone adapted to pick up the sound wave or noise in the pipeline fluid, and also adapted to record the noise or its intensity as a function of a parameter indicative of position along the pipeline traverse, or alternatively to transmit by means of electromagnetic or supersonic signals to the dispatching station desired information as to the noise encountered in the pipeline. In the latter embodiment there is provided at the dispatching station means for picking up the electromagnetic or supersonic signals and means for recording and/or monitoring the noise signals transmitted from the carrier during its traverse of the pipeline.

Figure 1 shows a diagrammatical view of an apparatus of this invention for surveying the noise inside a pipeline. In Figure 1 a sealed vehicle or carrier 111 is equipped with flexible cup-shaped rubber packers 116 and 117. The rear plate 112 of the carrier 111 is threaded for an eyebolt 115. A nut 114 and washer serve to hold in place the packer 117. The other end plate 113 of the carrier is drilled and tapped for three or more stanchions 123, and nuts 118 on the threaded stanchions together with a plate 137 serve to hold the forward packer 116 on the carrier. The packers 116 and 117 seal against the pipe wall and serve as the means by which the pumped fluid causes the carrier 111 to traverse the pipeline. The carrier 111 is sealed against entrance of pipeline fluid. The packers 116 and 117 form tight seals against the pipe 10 and being flexible allow the apparatus to move smoothly through the inside of the pipe. Furthermore, due to the tight seals of the packers against the pipe wall there will be substantially no leakage past the packers and the apparatus may move through the pipeline in a noiseless fashion. The packers also serve to isolate a microphone 124 located at the forward end of the vehicle from pump impulses which may be present behind the vehicle.

The forward end plate 113 of the carrier is equipped with stanchions 123, three or more in number, from which there is suspended a microphone 124 by means of springs 125. The microphone 124 is thus mechanically isolated from the body of the carrier 111 and serves to pick up any noise inside the pipeline ahead of the carrier 111. It is known that even small leaks produce considerable noise in the fluid in their close proximity, and it is the purpose of microphone 124 to pick up this noise. The vibrations picked up by microphone 124 are transmitted as electrical signals by flexible cable 119 to an amplifier 127 inside the carrier and the amplifier output energizes galvanometer 128 which by means of pen 129 records on a strip chart 138. The chart 138 is driven by a clock 131 through clutch 120 so that the microphone signals are recorded on the chart 138 as a function of time. Alternatively the amplifier 127 may be followed by a decibel meter so that the galvanometer 128 records the sound intensity only and not the respective vibrations themselves. The chart 138 is driven by a sprocket drum 130 whose teeth mesh with perforations in the chart. The record is rewound on a take-up reel driven by a spring in rewind mechanism 136.

From the record of the noise as a function of time, the location of any desired source of noise in the pipeline may easily be computed. For a uniform size of pipe and a uniform volumetric pumping rate, the pipeline distance from the dispatching end to the location of any desired recorded noise bears the same ratio to the total length of pipeline traverse as the time of traverse to the recorded noise bears to the total time of traverse. If as shown in Figure 1, the rate of motion of the record is also uniform then the ratio is the same as the respective lengths on the record.

Alternatively in Figure 1, the noise may be recorded as a function of distance traversed in the pipeline. For this purpose an odometer wheel 122 is carried on an arm 126 pivoted at 133 on the carrier 111. A spring 132 urges the arm outward so as to press the wheel firmly against the wall of the pipe. Rotation of the axle of the wheel 122 is transmitted to inside the carrier by means of a flexible drive cable 126. A gear box 134 having a clutch 121 provides for driving the drum 130 by the odometer wheel. When clutch 121 is engaged, the clutch 120 is disengaged. In this manner a record is obtained showing the noise as a function of distance traversed. The location of any particularly noisy, i.e. leaky, section of pipeline is easily obtained from the record knowing the circumference of wheel 122 and the number of sprocket teeth on drum 130.

Figure 2 shows an embodiment of the invention in which the record of noise is obtained as a function of pressure drop in the pipeline. As in Figure 1 the sealed carrier 211 is provided with end closures 212 and 213 to each of which is fastened a rubber cup-shaped packer 216 and 217. The forward end of the carrier is provided with stanchions 223 which suspend a microphone 224 on springs 225. The signal picked up by the microphone is transmitted by cable 219 to an amplifier 227 inside the carrier. The amplifier output is recorded by galvanometer 228 on a record drum 230.

Inasmuch as the pressure in a pipeline varies in a continuous manner from its input end to its output end there is a correspondence between absolute or gauge pressure and location along the pipeline. This correspondence is employed in the embodiment of Figure 2 to correlate the recorded noise with position along the pipeline. In order to drive the record drum 230 in proportion to pressure drop, the interior of a metallic bellows 231 is connected by means of duct 232 to the pipeline fluid behind the carrier 211 so that the pressure in the pipeline serves to expand the bellows. The closed end of the bellows 231 is fastened to a rack 238 whose free end is guided in bracket 233. The rack has fastened thereon a collar or pin 234 and a compressed spring 235 is placed on the rack between the collar 235 and the bracket 233. Expansion of the bellows thus compresses spring 235 and the spring collapses the bellows as the pressure falls. A pinion 236 engages the rack 238 and converts motion of the rack into shaft rotation which is transmitted through gear box 237 to the recording drum 230. Thus as the pressure drops as the apparatus moves from the input end of the pipeline to the output end of the pipeline, the spring 235 expands and motion of the rack turns the record drum 230.

By means of the embodiment of Figure 2 a record is obtained which shows the noise inside the pipeline as a function of pressure drop along the pipeline. Inasmuch as the pressure drop from input to output end of the pipeline is substantially a linear function of distance, it is possible to determine the location of any desired point on the record by simple calculation.

Figure 3 shows a diagrammatical view of an apparatus of this invention for surveying noise inside a pipeline which contains electrically-insulating fluids. In the embodiment of Figure 3 the signal is not recorded in the vehicle itself as in the embodiments of Figures 1 and 2, but the signal is transmitted through the pipeline to the dispatching station by means of very short wavelength electromagnetic radiation. The instrument carrier 311 is equipped with packers 330 and 331 similar to those of Figures 1 and 2 so that the carrier may be pumped through the pipeline. Additional packers 332 and 334 annular in shape may be clamped by means of annular flanges 335 on the outside of the carrier in order to more fully isolate the front of the carrier from pump noises. A microphone 315 is suspended on the front end of the carrier by means of stanchions 314 and springs 316 and the microphone 315 picks up noises in the pipeline ahead of the carrier. These noise vibrations are transmitted to an amplifier 317 inside the carrier and serve to modulate an ultra-high frequency radio transmitter 318 whose output is fed by coaxial cable through an insulating bushing 319 in the trailing end of the carrier to an antenna 320. The antenna 320 is designed to launch the modulated high-frequency electromagnetic waves into the pipeline and excite a wave-guide mode of oscillation in the fluid-filled pipeline which serves as a wave guide to transmit the high frequency electromagnetic signal to the dispatching station along the inside of the pipe. This mode of transmission is effective and efficient because the fluid in the pipeline is generally an electrical insulator, such as oil or other refined petroleum products. The electromagnetic signal suffers little attenuation in its transmission through the pipeline as a wave guide. Transmission is most efficient with higher modes of oscillation. By way of example the length of the launching antenna 320 may be one-half the radius of pipe 10. A frequency of from 300 to 3000 megacycles is preferred. The antenna 320 is connected to the transmitter 318 by a coaxial cable in well-known manner, the sheath of the cable being grounded to the carrier case.

The electromagnetic signal is intercepted by an antenna 322 which enters the pipeline by coaxial cable through insulating bushing 323 at or near the dispatching station. The antenna 322 is located the proper distance from the pipeline wall to afford proper coupling for the particular mode of wave guide transmission employed and for example may be located at one-half the distance from the wall to the axis of the pipe. The antenna 322 is connected to a UHF receiver 324 and may have an audio amplifier 325, the output being impressed on loud-speaker 330. By means of this system an observer at the dispatching station may listen to the noises encountered by the survey device of Figure 3 as it traverses the pipeline. Leaks are known to have a characteristic noise which can be identified by a trained observer. The operator notes the time at which the device is started in the pipeline, the time at which any leak noises are observed, and the time of arrival of the device at the other end of the line. From this information the position of the leak may be determined. Alternatively the observer may watch a pump-stroke counter (not shown) which counts the number of strokes of the input pump. From the pump-stroke count the operator can determine the volume of the displaced fluid to the point where the leak noises are observed, and from this the observer can compute the position of the leak along the pipeline.

Alternatively the noise may be recorded at the dispatching station by the galvanometer 326 connected to the amplifier 325. The galvanometer records on a record medium 331 whose longitudinal motion is proportional to time, the record being driven by a clock 328 by means of a sprocket drum 327. The record 331 is rewound by a spring-driven rewind mechanism 329. Alternatively the drum 327 may be driven by a pump-stroke counter (not shown) instead of clock 328. The antennas 320 and 322 shown in Figure 3 are meant to be schematic only and may have a form designed for efficient signal transmission in a manner well known in the art of wave guide transmission of electromagnetic radiation.

In another embodiment of the invention the noise of the leak is picked up by a microphone on the carrier and is transmitted to the dispatching station by means of supersonic vibrations in the pipeline fluid. Referring to Figure 4, the sealed carrier 411 is provided with packers 416 and 417 which serve as the means by which the carrier is pumped through the pipeline 10. The forward packer 416 is provided with one or more openings 418 for the purpose of maintaining equal pressure ahead of the apparatus and in the space between the packers. Suspended from the carrier 411 in the annular space between the packers is a microphone 419. The microphone 419 in the annular space between packers 416 and 417 will be shielded to a considerable extent from noise outside the annular space by the packers 416 and 417. Accordingly the microphone 419 will generate little or no signal unless a leak is encountered between the packers 416 and 417. The signal from microphone 419 is fed to an amplifier 420 whose output modulates an oscillator 422 by means of frequency modulator 421. The oscillator 422 preferably has a frequency in the range 20,000 to 1,000,000 cycles per second. The mircophone 419 is of a type which is insensitive to these supersonic frequencies, or alternatively an electric low-pass filter 423 may be connected between the microphone 419 and amplifier 420 to prevent supersonic frequencies from reaching the amplifier 420. Frequency-modulated output power from oscillator 422 is fed to a supersonic vibration transmitter 440 which is mounted on the carrier behind the packer 417. The transmitter 440 is preferably of a type having a pronounced transmission lobe along the axis of the pipeline rearward of the apparatus. Inasmuch as the velocity of sound in the metal (steel) of the pipe is higher than in the fluid inside the pipe, total reflection will occur at the fluid-pipe boundary, and the sound wave from transmitter 440 will suffer little attenuation in transmission along the fluid-filled pipe. The use of frequency-modulated supersonic sound transmission is desirable because it forms a carrier signal which is easily detectable over background noise.

At the dispatching station there is provided a microphone 430 capable of picking up the supersonic signals in the pipeline fluid. The output of microphone 430 is fed to an electrical high-pass filter 431 to remove any local noise signal which may be present. The high-frequency signal is amplified by amplifier 432, and passed through a discriminator type of FM detector 433. The resulting audio signal is representative of the noise picked up by microphone 419 and this is further amplified by amplifier 434 and either recorded or manually monitored. The signal from amplifier 434 is fed to a loud speaker 435 and the operator may listen for the leak sound which will appear loudest when the packers 416 and 417 straddle the leak. The hole 418 in the forward packer 416 allows the pipeline fluid access to the leak during the time the packers straddle the leak. By noting the time at which the operator hears the leak noise, he can compute the location of the leak. The operator notes the time at which the device of Figure 4 is started in the pipeline, the time at which the leak noises are observed, and the time of arrival of the device at the end of the line. From this information the position of the leak is determinable. Appropriate correction can be made for the transmission time of the supersonic sound wave through the pipe, since the sound velocity is high compared to the rate of travel of the carrier. Alternatively the operator may watch a pump-stroke counter (not shown) which counts the number of strokes of the input pump. From the pump-stroke count the operator can determine the volume of displaced fluid to the point where the leak noises are observed and from this the operator can compute the location of the leak along the pipeline.

Alternatively, the transmitted noise signal may be recorded at the dispatching station by the galvanometer 436 connected to the amplifier 434. The galvanometer records on a record medium 437 whose longitudinal motion is proportional to time, the record being driven by clock 438 by means of a sprocket drum 439. The record 437 is rewound by a spring-driven rewind mechanism. Alternatively the drum 439 may be driven by a pump-stroke counter (not shown) instead of clock 438. From the record thus obtained the operator can compute the location of the leak in the manner previously described.

The apparatus vehicle of any of the embodiments is launched in the pipeline at the dispatching station at the input end of the line through a customary scraper trap and upon entering the pipe is pumped therethrough by the normal movement of the fluid transported by the pipeline. After traversing the pipeline the apparatus is recovered at a scraper trap at the receiving end of the line. After traversing the pipeline the record chart in the embodiments of Figures 1 and 2 is removed and examined.

Figures 3 and 4 show embodiments of the invention in which pipeline noise is transmitted to the dispatching station by electromagnetic radiation or supersonic waves respectively, and it is within the purview of this invention to employ the method illustrated for recording or monitoring at the dispatching station any desired measured parameter of the pipe, for example, temperature, electrical potential gradient, pipe wall thickness, pipe surface roughness, inclination, curvature, etc.

Certain aspects of this invention are disclosed and claimed in copending applications Ser. Nos. 594,405; 594,482; 594,483; 594,541; 594,577; 594,642; and 594,643; all of which are by the same applicants and are assigned to the same assignee as the present application.

It is contemplated that the apparatus disclosed herein may be operated in conjunction with other apparatus for example that disclosed in the aforementioned copending applications in order to make two or more simultaneous surveys of different parameters of the pipeline. For making such a multi-purpose survey of the pipeline, it is within the purview of this invention to provide a train of instrumentalities without packers and which may be tied together with couplers, the train being pulled by one or more motive units with the motive unit equipped with one or more packers which serve to allow the pumped fluid to push the motive unit through the pipeline, thereby causing the entire train to traverse the pipeline. In such a train the packer on the motive unit is equivalent to a packer on the instrument vehicle since it serves as the means by which the pumped fluid causes the vehicle to traverse the pipeline. When used in a train of devices, the embodiments of Figures 3 or 4 will be the last member of the train so that the respective signals returned to the dispatching station through the pipeline will meet no obstructions.

It is contemplated that prior to running the apparatus disclosed herein, one or more scrapers or other known cleaning devices may be pumped through the pipeline in order to prepare the pipeline for a survey. It is further contemplated that any of the devices shown herein may itself be equipped with one or more scraper sections if such is necessary to obtain a reliable survey. Furthermore, the number of packers used on the instrument carrier may be varied to suit conditions.

What we claim as our invention is:

1. Apparatus for surveying a parameter of a pipeline which comprises a vehicle insertable in the pipe, a packer on said vehicle adapted to form a sliding seal against the wall of the pipe, means on said vehicle responsive to the desired parameter, means on said vehicle connected to said parameter-responsive means generating an ultra-high-frequency electric signal having a characteristic representative of said parameter, antenna means coupling said ultra-high-frequency generating means to the pipe as a wave guide, means for receiving said ultra-high-frequency signal in the pipe at a point spaced from said vehicle, and means connected to said receiving means for indicating the representative characteristic of said ultra-high-frequency signal.

2. Apparatus for surveying the noise in a pipeline which comprises a vehicle insertable in the pipe, a packer on said vehicle adapted to form a sliding seal against the wall of the pipe, a microphone carried by said vehicle and subjected to the noise in the pipeline, means on said vehicle connected to said microphone generating an ultra-high-frequency electric signal having a characteristic representative of the microphone signal, antenna means on said vehicle coupling said ultra-high-frequency generating means to the pipe as a wave guide, antenna means in said pipe at a point spaced from said vehicle adapted to detect said ultra-high-frequency signal in the pipe, and means connected to said last-named antenna means indicating the representative characteristic of said ultra-high-frequency signal.

3. Apparatus for surveying a parameter of a pipeline which comprises a vehicle insertable in the pipe, a packer on said vehicle adapted to form a sliding seal against the wall of the pipe, means on said vehicle responsive to the desired parameter, means on said vehicle connected to said parameter-responsive means generating an electric signal of supersonic frequency, said signal having a characteristic representative of said parameter, transducing means on said vehicle converting said supersonic signal into supersonic vibrations in the pipeline fluid, means for receiving said supersonic vibrations in the pipe at a point spaced from said vehicle, and means connected to said receiving means for indicating the representative characteristic of the received signal.

4. Apparatus for surveying the noise in a pipeline which comprises a vehicle insertable in the pipe, a packer on said vehicle adapted to form a sliding seal against the wall of the pipe, a microphone carried by said vehicle and subjected to the noise in the pipeline, means on said vehicle connected to said microphone generating electric signals of supersonic frequency having a characteristic representative of the microphone signal, transducing means on said vehicle adapted to convert said supersonic signals into supersonic vibrations in the pipeline fluid, means for receiving said supersonic vibrations in the pipe at a point spaced from said vehicle, and means connected to said receiving means indicating the representative characteristic of the received signal.

5. Apparatus for surveying a parameter of a pipeline which comprises a vehicle insertable in the pipe, a packer connected to said vehicle adapted to form a sliding seal against the wall of the pipe, means on said vehicle responsive to the desired parameter, means on said vehicle connected to said parameter-responsive means generating a radiation signal having a characteristic representative of said parameter, means on said vehicle connected to said generating means radiating said signal in the pipeline, means for receiving said radiated signal in the pipe at a point spaced from said vehicle, and means connected to said receiving means responsive to said signal and indicating the representative characteristic thereof.

References Cited in the file of this patent

UNITED STATES PATENTS

| | | |
|---|---|---|
| 2,570,951 | Hugo et al. | Oct. 9, 1951 |
| 2,615,080 | Mathews et al. | Oct. 21, 1952 |
| 2,685,685 | Lathrop et al. | Aug. 3, 1954 |
| 2,782,370 | Ver Nooy | Feb. 19, 1957 |